US010480861B2

(12) United States Patent
Brocchetto

(10) Patent No.: US 10,480,861 B2
(45) Date of Patent: Nov. 19, 2019

(54) PROCESS OF MAKING ELECTRIC STOVES

(71) Applicant: Diego Brocchetto, Transacqua (IT)

(72) Inventor: Diego Brocchetto, Transacqua (IT)

( * ) Notice: Subject to any disclaimer, the term of this patent is extended or adjusted under 35 U.S.C. 154(b) by 271 days.

(21) Appl. No.: 15/389,081

(22) Filed: Dec. 22, 2016

(65) Prior Publication Data

US 2017/0184346 A1  Jun. 29, 2017

(30) Foreign Application Priority Data

Dec. 23, 2015 (IT) .......................... 102015000087354

(51) Int. Cl.
*H05B 3/66* (2006.01)
*F27D 1/00* (2006.01)
(Continued)

(52) U.S. Cl.
CPC ............ *F27D 1/0036* (2013.01); *F24C 7/002* (2013.01); *F24C 7/062* (2013.01); *F24D 13/022* (2013.01);
(Continued)

(58) Field of Classification Search
CPC .......... F24C 7/002; F24C 7/062; F24C 15/06; F27D 1/0006; F27D 1/0036; F24H 3/002; F24H 2250/02; F24D 13/022; F27B 1/14; Y02B 30/26
USPC ....... 219/390, 391, 392, 395, 400, 406, 407, 219/408, 409, 410; 373/117, 118, 119, 373/120, 125, 126, 127, 128, 129, 130, 373/134, 137
See application file for complete search history.

(56) References Cited

U.S. PATENT DOCUMENTS 7,145,932 B2 * 12/2006 Sakaguchi ............... H05B 3/66
373/119

FOREIGN PATENT DOCUMENTS

DE  683141 C  10/1939
DE  726226 C  10/1942
(Continued)

*Primary Examiner* — Hung D Nguyen
(74) *Attorney, Agent, or Firm* — Alan G. Tower; Leech Tishman Fuscaldo & Lampl

(57) ABSTRACT

The present invention relates to a process of making power-saving electric stoves, particularly having a large size and outer shapes similar to the conformations of traditional Tyrolean heaters or stoves, while having a very light weight and being easily movable to multiple locations of a house. The main characteristic of the present invention is that it includes making a hollow stove body, particularly having a large size, from expanded polystyrene or a similar thermoplastic polymer, with the application of an electric resistor, particularly a constant-power, and hence low-power consuming heating cable arranged around its outer surface in one or more coil loops with the interposition of a layer of adhesive material with at least one thread formed therein for supporting the resistor, with contiguous insulating grooves, and with later application of a final coating layer, made e.g. of tire-resistant cement mortar, whose outer surface may be provided with decorative designs or finishes and ornaments made of wood or other materials, which designs and ornaments may be similar to those formed on the outer surfaces of traditional Tyrolean stoves, whereas the basement of the hollow body is preferably supported by a smooth metal plate, allowing displacement thereof to any location of the house, proximate to a power outlet.

7 Claims, 1 Drawing Sheet

(51) Int. Cl.
*F24C 7/06* (2006.01)
*F24H 3/00* (2006.01)
*F24C 7/00* (2006.01)
*F24D 13/02* (2006.01)
*H05B 3/48* (2006.01)
*A21B 1/00* (2006.01)
*F24C 15/06* (2006.01)
*F27B 1/14* (2006.01)

(52) U.S. Cl.
CPC .............. *F24H 3/002* (2013.01); *F24C 15/06* (2013.01); *F24H 2250/02* (2013.01); *F27B 1/14* (2013.01); *Y02B 30/26* (2013.01)

(56) References Cited

FOREIGN PATENT DOCUMENTS

| | | |
|---|---|---|
| DE | 2227798 A1 | 12/1973 |
| DE | 29805832 U1 | 6/1998 |
| DE | 20215394 U1 | 2/2003 |
| EP | 0242787 A2 | 10/1987 |
| FR | 2737769 A1 | 2/1997 |
| WO | WO 2004/033969 A1 * 4/2004 | ............ F24B 1/1802 |

\* cited by examiner

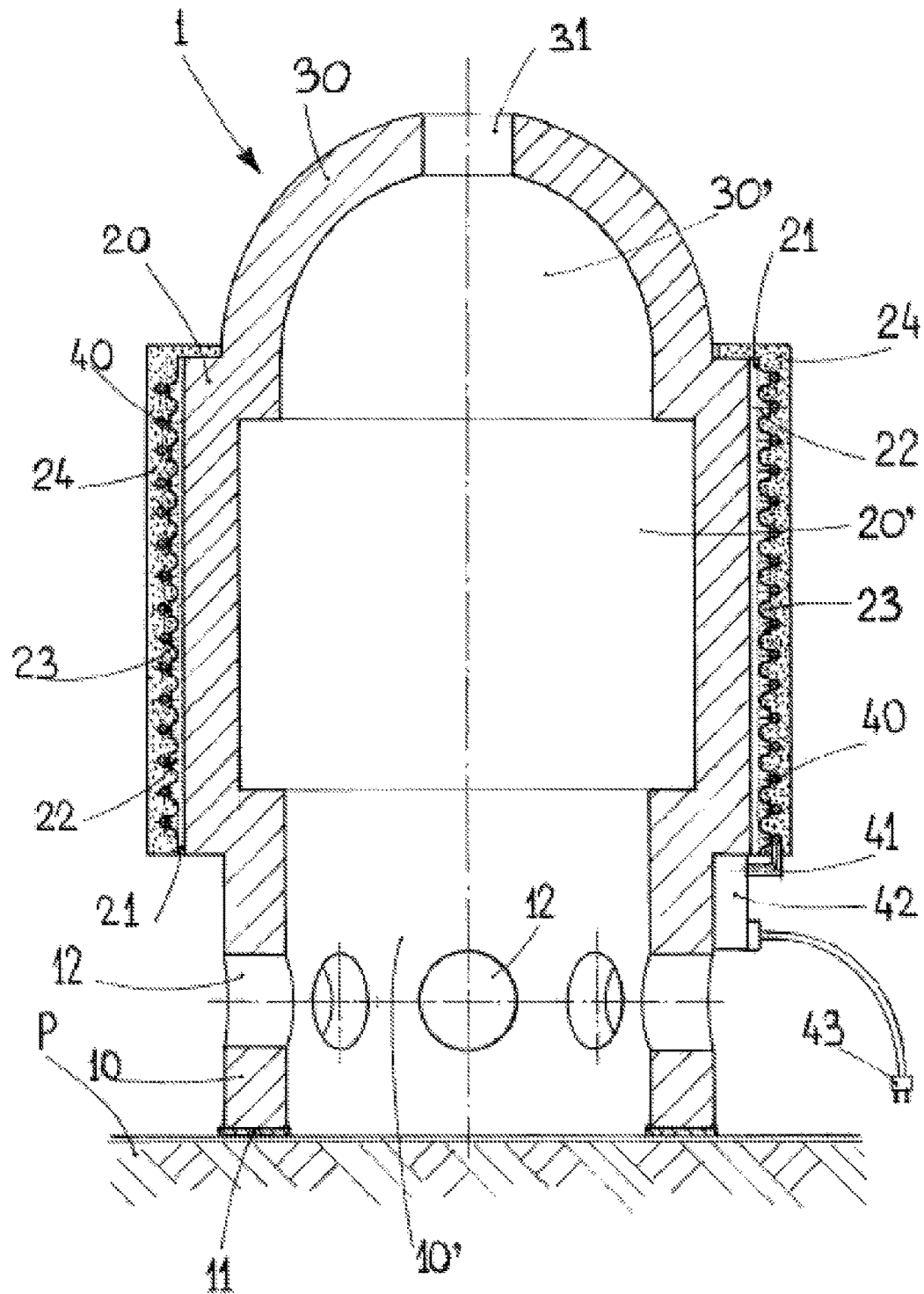

PROCESS OF MAKING ELECTRIC STOVES

CROSS-REFERENCE TO RELATED APPLICATION

This application claims the benefit of Italian Patent Application No. 102015000087354 filed Dec. 23, 2015, which is incorporated herein by reference.

FIELD OF THE INVENTION

The present invention relates to a working process of making power-saving electric stoves, particularly having a large size and outer shapes similar to the conformations of traditional Tyrolean heaters or stoves, while having a very light weight and being easily movable to multiple locations of a house.

BACKGROUND INFORMATION

Electric stoves are household appliances that are generally used as an auxiliary heat source, to enhance heating of a room that is already equipped with a general heating system or to increase the temperature of a portion of the same room, preferably for a time that is limited to the time in which people are present in that area.

These limitations in the use of electric stoves are generally caused by the cost of electric power, which is certainly not the least expensive, as compared with other energy sources for heating such as methane or liquid propane gas, as well as diesel oil or other forms of liquid and solid fuel.

These electric stoves are known to consist of a light metal structure which is adapted to support a small incorporated electrical resistor, such resistor heating up upon power on, thereby diffusing the heat of such resistor to a radius of a few meters from the irradiating surface, generally with the help of a fan incorporated in the stove itself.

Due to their simple construction and small size, current electric stoves are advantageously available at rather low costs and also with attractive shapes, but have exhibited a number of drawbacks heretofore in terms of continuous use, due to their high power consumption associated with poor energy performance, whereby they are widely sold, but only for occasional use.

Stoves are also known which use halogen, quartz or IR lamps instead of mechanical or ceramic resistors, to improve performance, although in a range of small powers and sizes, considering a limited use thereof.

Recent developments in technologies for generation of electricity from sources other than traditional liquid and solid fuel sources, particularly for independent and continuous use, such as the one that might be obtained from photovoltaic panels, motivates an ever increasing number of consumers to consider the possibility of using the electricity generated with these new processes for heating.

Even in the field of electrical resistors, the leading-edge technology ensures the provision of heating cables having a high and constant linear power, with nichrome heating wires, providing a high and regular thermal efficiency.

SUMMARY OF THE INVENTION

The main purpose of the present invention is to use the most recent alternative energy sources, or anyway to also provide energy sources that are at least alternative to conventional solid or liquid fuels, to have an economically sufficient energy allowing the use of the most recent heating cables, for heating at least an entire room of a house or a room to be stably used, as a supplement or an alternative to one of the conventional heating systems.

Within the above purpose, another important object of the present invention is to provide a heating structure that has a visually pleasant appearance and may be stably integrated in the interior furniture of a residential or public space.

Another object of the present invention is to provide a heating structure that is light and easy to handle to such an extent that it may be moved to multiple locations of a room, or to different locations of a single house.

Yet another object of the present invention is to provide a heating structure that has no flue gas emissions, which makes it perfectly environment friendly and adapted to be moved to any location of the house, as it is independent of any external connection and does not have to be connected to chimneys or exhaust ducts.

These and other objects are fully achieved by the present invention which includes making a hollow stove body from polystyrene or a similar thermoplastic polymer, with the application of an electric resistor with a constant-power heating cable with low power consumption arranged around the outer surface of said hollow body in one or more coil loops with the interposition of a layer of adhesive material with at least one thread or raised loop with contiguous grooves, and with later application of a final coating layer, made e.g. of fire-resistant cement mortar, whose outer surface may be provided with decorative designs or finishes and ornaments made of wood or other materials, which designs and ornaments may be identical or similar to those formed on the outer surfaces of traditional Tyrolean stoves, whereas the basement of said hollow body is preferably supported by a smooth metal plate, allowing displacement thereof to any location of the house, proximate to a power outlet.

BRIEF DESCRIPTION OF THE DRAWING

Further details and constructive and functional features, which are set forth in the annexed claims, will be described and illustrated below, by way of example and without limitation, also with the help of the schematic FIGURE provided in the annexed drawing, which shows an actually sectional and vertical view.

DETAILED DESCRIPTION

According to the exemplary embodiment of said FIGURE, a stove (1) is essentially composed of a basement (10), a cylindrical heating body (20) and a hemispherical covering cap (30), each of such parts (10, 20, 30) being formed from adequate blocks of expanded polystyrene, having inner cavities (10', 20', 30'), said blocks or parts (10, 20, 30) being opportunely joined together one on top of the other, e.g. by interlocked connection or heat welding of their edges to form a single cylindrical stove structure (1) whose diameter and height may vary according to the desired heating and visual requirements, but whose overall size and shape may be similar to the sizes and shapes of traditional Tyrolean-style stoves.

Particularly, with the present process, the outer surface of the heating body (20) is coated with a layer of adhesive material (21) which includes at least one raised thread (22) with contiguous lateral insulating grooves (23), said thread (21) extending in a spiral arrangement all along said outer surface of said heating body (20).

A heating cable or electrical resistor (40), particularly of the aforementioned type with high and constant linear power, e.g. with nichrome wires affording a high and regular thermal efficiency, is applied along the top of the thread (22).

This heating cable (40) extends along the entire length of said loop (22) and, as the adhesive material (21) dries also along said loop (22), it is designed to be rigidly joined to the outer surface of the heating body (20).

Such heating cable or resistor (40) obviously has a wired connecting cable (41) that joins it to a junction box (42) for power-on and adjustment of the thermal features of the stove (1), and also has a plug (43) for connection to the supply mains.

The heating cable (40) is also known to have a specific power, indicatively 25 Watts per linear meter. Assuming that the stove as shown in the next FIGURE have a diameter of 1 m, it would have a circumference of 3.14 m. Considering the fifteen loops that are exemplarily shown in the annexed FIGURE, the overall length of the heating cable or resistor (40) will turn out to be about 47.10 m, resulting in a power of 1.177 KW.

Of course, with twice the number of loops (22), even with a heating body (20) of the same height, the length of the resistor (40) would also be doubled, resulting in a power of 2.355 KW, and the power may also proportionally increase as the diameter of the heating body (20) increases.

The polystyrene that constitutes the basement (10), the heating body (20) and the cap (30) of the stove (1) as shown in the FIGURE, is known to be a styrene polymer, in its expanded vitreous solid form which, assumes a plastic state at about 100° C., that would lead it to decompose at about 270° C., and is generally used to form packages and thermally insulating covers.

The application and actuation of the specific-linear power heating cable (40) along the thread (22) of the adhesive layer (21) which covers the outer surface of the heating body (20) ensures that a maximum temperature of 70° C. is reached, which is well below the possible plastic transformation temperature of polystyrene, or any other similar material that would particularly form the heating body (20). Therefore, the body (20), as well as the underlying basement (10) and the overlying cap (30) will be able to constantly ensure rigidity and lightweight, also under maximum heating conditions of the resistor (40), thereby allowing the stove (1) to be moved from one location to another of the house or the floor (P), according to the main object as set forth above.

The outer surface of the heating body (20) is completed by a coating (24), indicatively made of a fire-resistant cement mortar, which will also cover the electrical resistor (40) and also fill the insulating grooves (23) of the thickness of the adhesive material (21), to form an even and preferably smooth surface, which may be provided with decorative designs or finishes and ornaments made of wood or other materials, which designs and ornaments may be similar to those formed on the outer surfaces of traditional Tyrolean stoves.

A similar coating, made e.g. of fire-resistant cement mortar, is advantageously also provided on the outer surface of the basement (10) and the cap (30), to enhance rigidity and resistance to impacts, stresses or irregular thrusts, and to protect the entire stove (1) from possible corrosive agents.

As shown in the accompanying FIGURE, the basement (10) preferably lies over a disk or a circular ring (11), preferably made of metal or another rigid material, which disk (11) has a smooth bottom surface, for enabling easy displacement of the stove (1), e.g. by dragging it, from one power outlet to another of a room or a house extending on one floor (P).

Also, the basement (10) has one or more through holes (12) facilitating access of air from the surrounding environment, for such air to be heated in the compartment (20') of the heating body (20) and flow back at a higher temperature into the environment through hole (31) of the cap (30).

As mentioned above, polystyrene is known to be an insulating material, whereby very little heat is transferred from the heating body (20) to its inner compartment (20') and is advantageously recovered by air circulation from the hole (12) of the basement (10) to the hole (31) of the cap (30), whereas most of the heat generated by the resistor (40) is radiated by the coating (24) of the outer surface of said heating body (20).

In short, the present process of making large-size, high-power and low-weight electric stoves, that can thus be moved to any location of a house extending on one floor (P), in which a power outlet is provided, is possible thanks to the association of the light-weight characteristics of the polystyrene that constitutes their structure (10, 20, 20) and the specific linear power characteristics of the heating cable (40), affording the desired heat-generation capacity as well as a decorative appearance, contributing to the interior design of the house.

As mentioned above, the junction box (42) is not only equipped with a power switch, but is also connected to a room thermostat and a probe applied to the compartment (20') of the heating body (20), to control full or partial actuation and power-off of the resistor (40), and is also equipped with appropriate monitoring, adjustment and control instruments, as is known in the art.

The outer coating (24) of the heating body (20), the basement (10) and the cap (300), besides acting as an irradiation unit, as mentioned above, also allows the provision of decorations and the application of ornaments that will make the stove (1) perfectly compatible with the furniture of the house. Furthermore, the mobility of the stove (1) allows, for example, it's basement (10) to be introduced in the compartment of a chest or another piece of furniture, with the possibility of varying and changing the design in response to changes in housing conditions, as set forth in one of the aforementioned purposes.

The low cost of polystyrene or the other similar material that forms its structure (10, 20, 30) allows a Tyrolean electric stove to be provided for each room of a house, still at a low cost, with possibilities of interchanging stoves and coordinating decorations with the furniture of each room.

The present process of making movable Tyrolean electric stoves may be also implemented obviously to make stoves of any shape and size. For example, there is the possibility of making stoves (1) having a heating body (20) with a square or polygonal, possibly irregular shape, and different shapes may be also provided for the basement (10) and the cap (30). The possibility is also provided to make stoves (1) with no basement (10), and equipped with a heating body (20) with coils (40) substantially reaching a point proximate to the basement support (11), and to make electric stoves (1) with no cap (30) or with a flat top cover, having one or more heated air outlets, possibly at the sides.

Also, there is the possibility of providing two or more independent resistor coils (40), to be manually or automatically actuated individually or together, to adjust the desired ambient temperature to be reached, and of providing coils (40) to be applied to vertically, longitudinally or diagonally extending threads (22) to any flat or curved surface of the heating body (20), and the coils (40) and their supports (22) may be applied to accessory elements of the stove (1) such as a bench or a partition wall, obviously connected to the basement (10) or the heating body (20) and movable with the stove (1).

The invention claimed is:

1. A process for making movable Tyrolean electric stoves, including:
   making a hollow stove body from a thermoplastic polymer, the hollow stove body having a basement, a heating body and a cap covering the heating body,
   coating an outer surface of the heating body with a layer of adhesive material, which includes at least one raised thread having a thread top, and insulating grooves contiguous to the thread top, the raised thread of adhesive material extending in a spiral arrangement all along the outer surface of the heating body,
   applying around the outer surface of the hollow body an electric resistor comprising a constant-power heating cable with low power consumption the electric resistor being applied on and along the thread top and being arranged in one or more coil loops following the spiral arrangement of the thread,
   subsequently applying a final coating layer comprising a fire-resistant material over the hollow body, the fire-resistant material covering the electrical resistor and filling the insulating grooves, the final coating layer provided with decorative designs, finishes or ornaments similar to those formed on the outer surfaces of traditional Tyrolean stoves,
   wherein the heating body, basement and covering cap are formed from blocks of expanded polystyrene, having inner cavities and joined together one on top of the other to form a single block or bearing structure whose diameter and height may vary according to desired heating requirements.

2. A The process as claimed in claim 1, wherein, once the electric resistor has been firmly attached to tops of the spiral thread, the heating body and the resistor are covered and coated by the final coating, and the final coating layer comprises a fire-resistant cement mortar having an outer surface provided with the decorative designs, figures or ornaments.

3. The process as claimed in claim 1, wherein the heating cable or electric resistor has a wired connection that joins it to a junction box having a power switch and instruments for adjusting thermal features of the stove, and also having a plug for connection to a supply main.

4. The process as claimed claim 1, wherein the basement that supports the heating body lies over a smooth rigid circular plate having a smooth bottom surface for enabling easy sliding displacement of the stove over a floor.

5. The process as claimed claim 1, wherein the basement that supports the central heating body has one or more openings or air inlets facilitating access of air from the surrounding environment into the basement and through the hollow body back into the environment through one or more holes.

6. The process as claimed in claim 1, wherein the heating cable provides a selected heat generating capacity.

7. The process as claimed in claim 1, wherein the electric stove is movable.

\* \* \* \* \*